United States Patent [19]

Hashikawa

[11] Patent Number: 5,553,982

[45] Date of Patent: Sep. 10, 1996

[54] FLUID TYPE PUSHER WITH THRUST INDICATOR

[75] Inventor: Yoshito Hashikawa, Nagasaki, Japan

[73] Assignee: Japan Development Consultants, Inc., Nagasaki, Japan

[21] Appl. No.: 288,243

[22] Filed: Aug. 9, 1994

[30] Foreign Application Priority Data

May 6, 1994 [JP] Japan .................................. 6-117537

[51] Int. Cl.⁶ ............................................ F16B 31/02
[52] U.S. Cl. ............................ 411/14; 411/8; 411/917
[58] Field of Search .......................... 411/8–14, 432, 411/434, 917; 116/272

[56] References Cited

U.S. PATENT DOCUMENTS

| | | | |
|---|---|---|---|
| 1,631,714 | 6/1927 | Wellman | 116/272 |
| 2,571,265 | 10/1951 | Leufuen | 411/434 |
| 3,033,597 | 5/1962 | Miller | 411/917 |
| 3,435,777 | 4/1969 | Schaaf | 411/432 |
| 3,463,044 | 8/1969 | Rossman et al. | |
| 3,779,080 | 12/1973 | Smith | 116/272 |
| 4,777,828 | 10/1988 | Ferris | 116/272 |
| 5,046,906 | 9/1991 | Bucknell | 411/917 |

FOREIGN PATENT DOCUMENTS

| | | | |
|---|---|---|---|
| 2052788 | 5/1972 | Germany | 411/434 |
| 1418526 | 8/1988 | U.S.S.R. | 411/14 |

*Primary Examiner*—Flemming Saether
*Attorney, Agent, or Firm*—Sughrue, Mion, Zinn, Macpeak & Seas

[57] ABSTRACT

An annular fluid type pusher for tightening a part on a shaft comprises, a body mounted on the shaft, a pushing piece for pushing the part with a fluid pressure, a sealed fluid path formed annular in the body for sealingly containing a fluid and slidably holding said pushing piece in part, a fluid pressure adjusting section for adjusting the fluid pressure, an indicator cylinder chamber communicated with the sealed fluid path, an indicator piston slidably provided in the cylinder chamber, a spring to urge the piston against the fluid pressure, and a thrust indicating bar. Thrust graduation lines have been marked on the thrust indicating bar. And one end portion of the thrust indicating bar is connected to the piston, and the other end portion is provided in such a manner as to be protruded in association with the movement of the piston which is slidably moved in proportion of the fluid pressure.

7 Claims, 5 Drawing Sheets

FLUID TYPE PUSHER WITH THRUST INDICATOR

BACKGROUND OF THE INVENTION

This invention relates to an annular fluid type pusher which is mounted on a shaft to fasten a part set on the shaft and has a pressing piece for pushing the part with fluid pressure, and a fluid pressure adjusting section.

FIG. 5 shows an annular fluid type pusher which is a prior development of the present Applicant. The fluid type pusher of FIG. 5 is mounted on a shaft to fasten a part on the shaft and has a pressing piece 16 for pressing the part with fluid pressure, and a fluid pressure adjusting section 13 for adjusting the fluid pressure.

The fluid type pusher 11 is mounted on a shaft on which a part is set, and then it is secured with a nut. Under this condition, a pushing screw 14 in the fluid pressure adjusting section 13 is screwed in with a torque wrench 12 fitted with a gauge (hereinafter referred to as "a gauge-fitted torque wrench 12", when applicable) to push a pressurizing piston 15 inwardly thereby to increase the fluid pressure in the fluid type pusher 11. As a result, the pushing piece 16 set between the part and the pusher 11 is moved towards the part to fasten the latter.

The gauge-fitted torque wrench, which is a precision tool, is expensive. Furthermore, it is liable to be broken when shocked. Hence, it must be handled with great care. Thus, it is rather troublesome to use it at the working site.

In the gauge-fitted torque wrench, the torque gauge is limited in the range of graduations. Hence, in the case where it is required to adjust the thrust of the pushing piece in a wide range which is adapted to push the part with fluid pressure, it is necessary to use a plurality of gauge-fitted torque wrenches.

The gauge-fitted torque wrench is a torque gauge. Therefore, in order to obtain a thrust value which is actually required for the pushing piece adapted to push a part with fluid pressure, it is essential to perform a mathematical conversion, which makes it rather troublesome to handle the gauge-withfitted torque. On the other hand, the coefficient of friction of the fluid pressure adjusting section depends on the finish accuracy of the threaded portion of the fluid pressure adjusting section, and therefore the value obtained through the conversion may be different from the actual thrust value.

Accordingly, an object of this invention is to eliminate the above-described difficulties accompanying a conventional fluid type pusher. More specifically, an object of the invention is to provide a fluid type pressure with a thrust indicator in which the thrust of the pushing piece adapted to push a part with fluid pressure is readily detected by reading a thrust measuring bar which is protruded in proportion to the fluid pressure, thus eliminating the use of an expensive gauge-withfitted torque wrench.

SUMMARY OF THE INVENTION

The foregoing object of the invention has been achieved by the provision of an annular fluid type pusher for tightening a part on a shaft comprising, a body mounted on the shaft, a pushing piece for pushing the part with a fluid pressure, a sealed fluid path formed annularly in the body for containing a fluid and slidably holding said pushing piece in part, a fluid pressure adjusting section for adjusting the fluid pressure, an indicator cylinder chamber in communication with the sealed fluid path, an indicator piston slidably provided in the cylinder chamber, a spring to urge the piston against the fluid pressure, and a thrust indicating bar. Thrust graduation lines have been marked on the thrust indicating bar. And one end portion of the thrust indicating bar is connected to the piston, and the other end portion is provided in such a manner as to be protruded in association with the movement of the piston which is slidably movable in proportion of the fluid pressure.

The fluid type pusher according to the invention operates as follows: By operating the fluid pressure adjusting section of the fluid type pusher with a hexagon wrench, which is not expensive, the pressure of fluid in the sealed fluid path is gradually increased, and applied to the cylinder chamber through a communicating path to push the piston outward. As the piston is pushed outward in this manner, the other end portion of the thrust measuring bar which is connected to the piston, is protruded from the outer cylindrical surface of the body of the fluid type pusher. In this connection, the spring for urging the piston against the pressure the fluid is so selected as to have a predetermined spring constant, and the graduation lines marked on the thrust measuring bar which protrudes from the outer cylindrical surface of the body of the fluid type pusher in proportion to the pressure of fluid are adjusted to be coincident with thrusts to be produced. Hence, while monitoring the thrust to be produced, the operator is able to push the part with the fluid type pusher using the inexpensive wrench.

DETAILED DESCRIPTION OF THE PREFERRED EMBODIMENTS

This invention will be described more concretely with reference to its preferred embodiments shown in the accompanying drawings.

Figure 1:
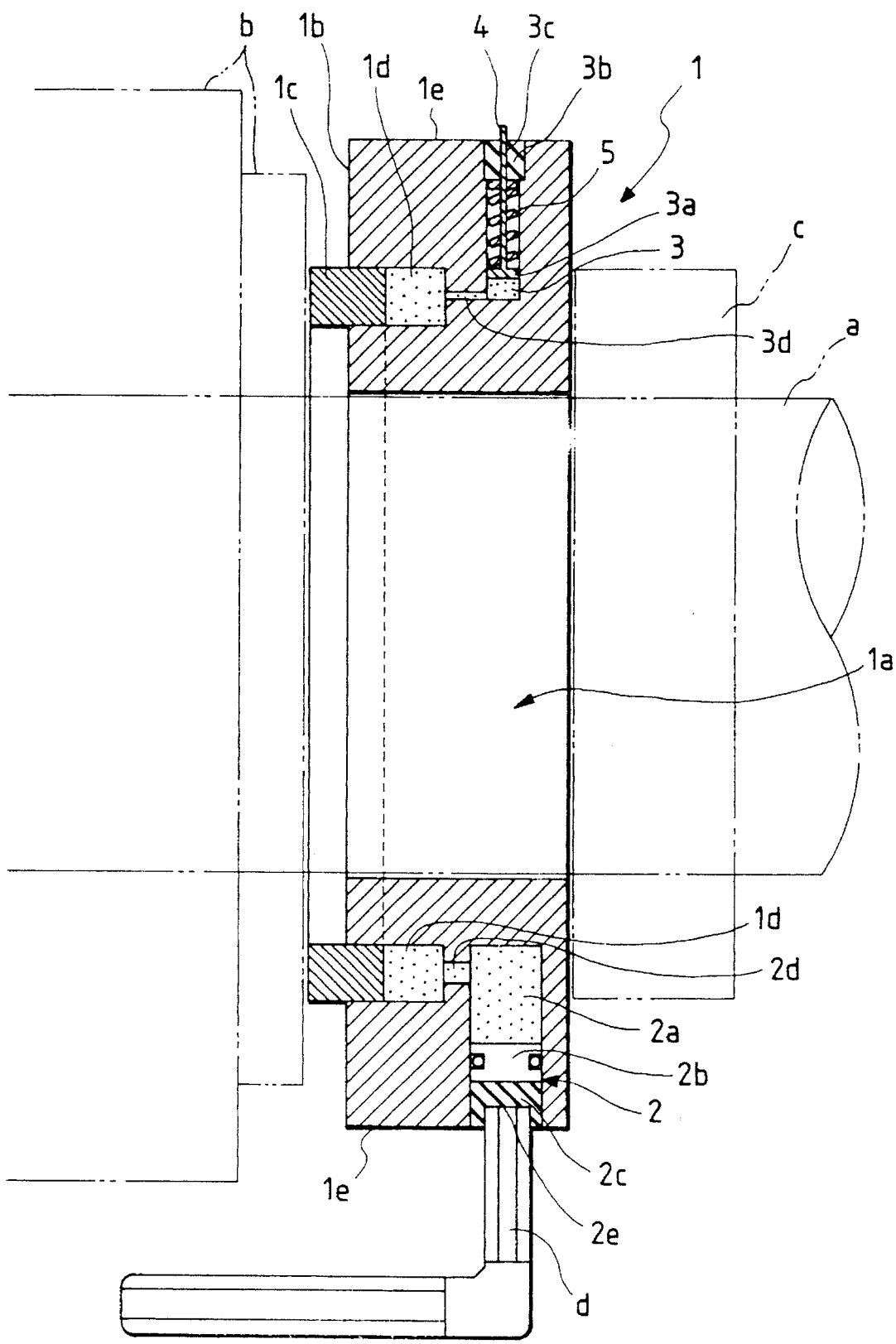
FIG. 1 is a sectional view of an example of a fluid type pusher with a thrust indicator according to the present invention.
Figure 2:
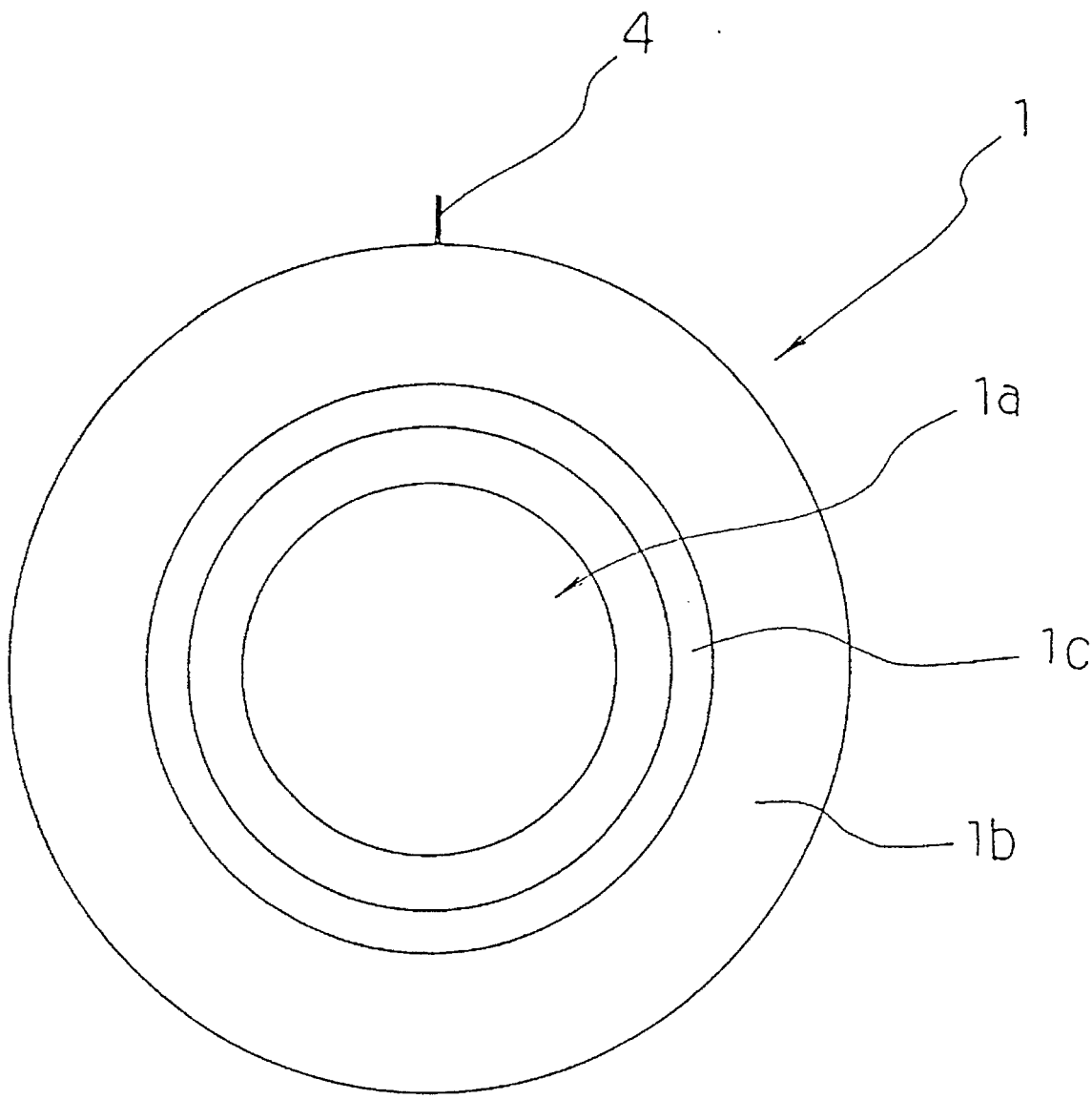
FIG. 2 is a front view of the fluid type pusher shown in FIG. 1.
Figure 3:
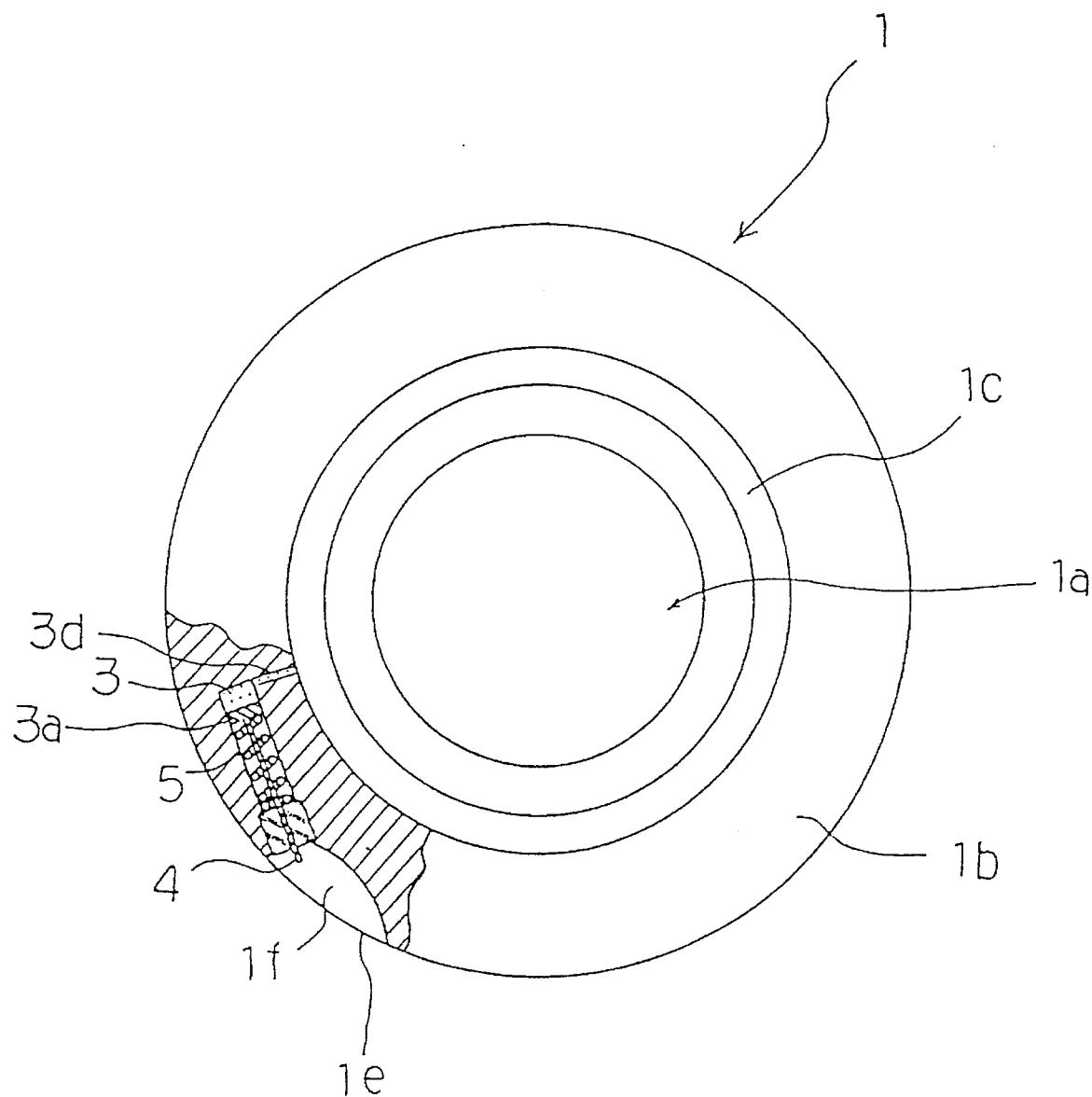
FIG. 3 is a front view of another example of the fluid type pusher according to the present invention.
Figures 4A, 4B:
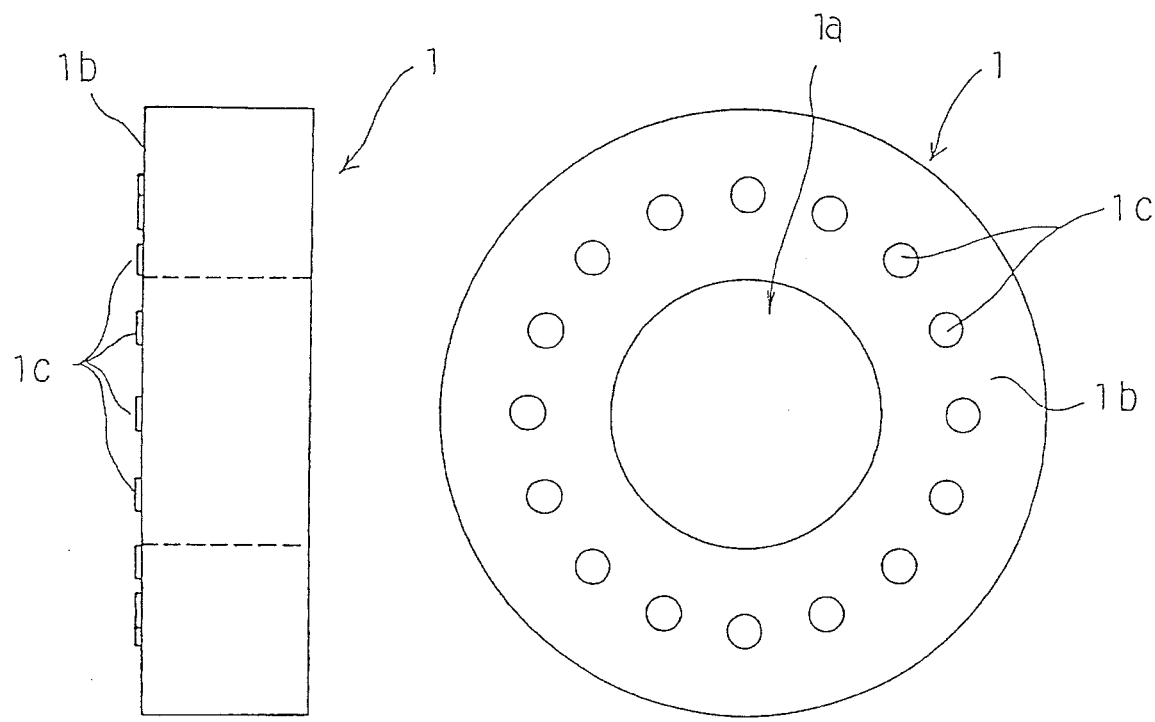
FIGS. 4(A) and 4(B) are a front view and a side view, respectively, showing another example of the fluid type pusher according to the present invention.
Figure 5:
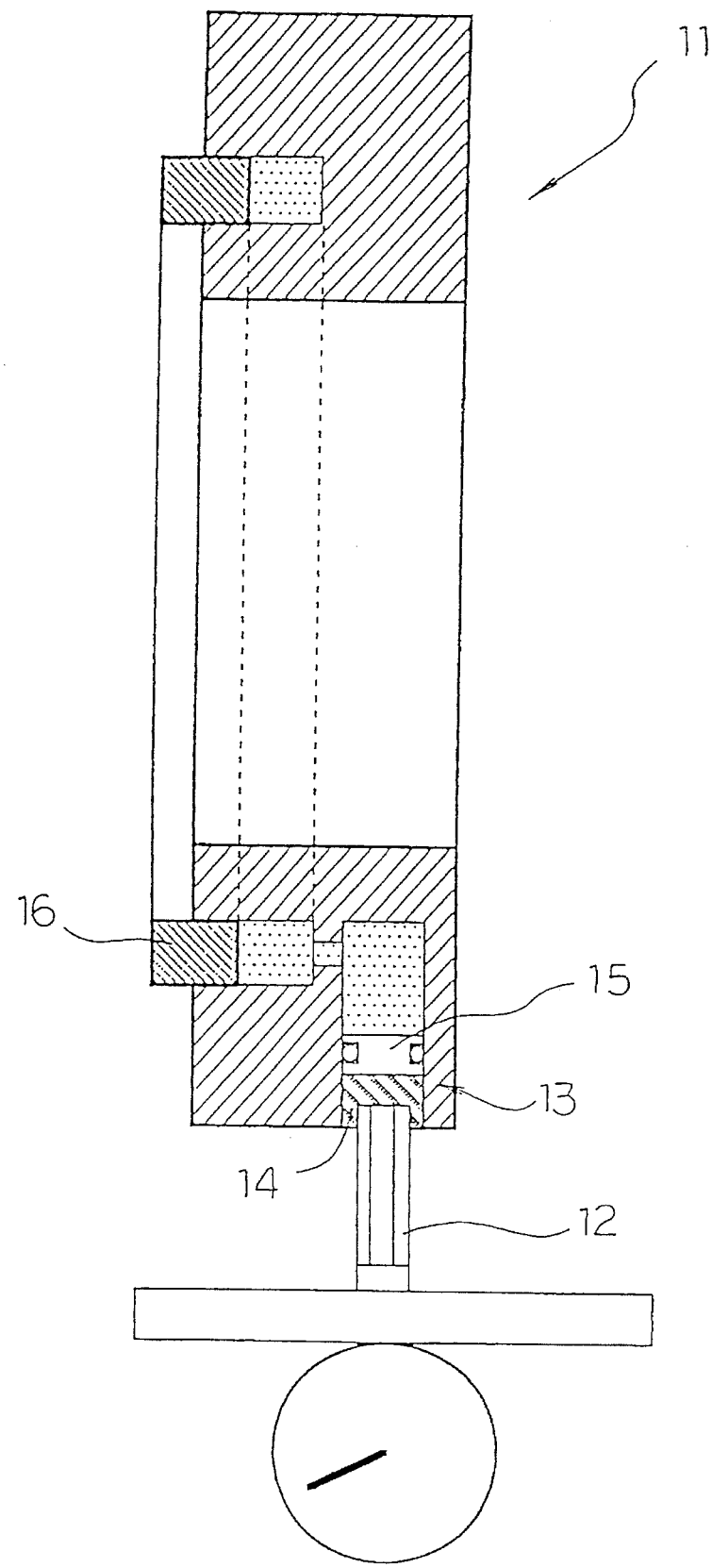
FIG. 5 is a sectional view of a fluid type pusher which was previously developed by the present applicant.

FIG. 1 is a sectional view of an example of a fluid type pusher with a thrust indicator (hereinafter referred to merely as "a fluid type pusher", when applicable) which constitutes a first embodiment of the invention. FIG. 2 is a front view of the fluid type pusher shown in FIG. 1. FIG. 3 is a front view of another example of the fluid type pusher, which constitutes a second embodiment of the invention. FIG. 4(A) and 4(B) are a front view and a side view, respectively, showing another example of the fluid type pusher, which constitutes a third embodiment of the invention.

As shown in FIGS. 1 and 2, the body of the fluid type pusher 1 (hereinafter referred to as "a pusher body", when applicable) is in the form of a ring having a certain thickness, and has a circular through-hole 1a at the center into which a shaft a is inserted. An annular pushing piece 1c is coupled to one annular end face 1b of the pusher body which abuts against a part b set on the shaft a. The pushing piece 1c pushes against the part b thereby to fasten the latter b.

A sealed fluid path 1d is formed in the pusher body. The sealed fluid path 1d is also annular. The pushing piece 1c is partially inserted into the sealed fluid path 1d, so that it is pushed towards the part b by the fluid in the sealed fluid path 1d. The fluid is non-compressive oil or grease.

A fluid pressure adjusting section 2 is provided in the pusher body. The fluid pressure adjusting section 2 is to adjust the pressure of fluid in the sealed fluid path 1d. The fluid pressure adjusting section 2 comprises: a pressurizing cylinder chamber 2a; a pressurizing piston 2b slidably fitted in the pressurizing cylinder chamber 2a; and a pushing screw 2c for pushing the pressurizing piston 2b.

A pressurizing communicating path 2d is provided between the pressurizing cylinder chamber 2a and the above-described sealed fluid path 1d; that is, the pressurizing cylinder chamber 2a is in communication with the sealed fluid path 1d through the pressurizing communicating path 2d.

The pressurizing cylinder chamber 2a is extended from the outer cylindrical surface 1e of the annular pressure body towards the central axis of the through-hole 1a; more specifically it is open in the outer cylindrical surface 1e. The aforementioned pushing screw 2c is provided in the opening of the pressurizing cylinder chamber 2a.

The outer portion of the cylindrical surface of the pressurizing cylinder chamber 2a is threaded near the opening formed in the outer cylindrical surface 1e. That is, the pushing screw 2c is threadably engaged with the threaded portion of the cylindrical surface of the pressurizing cylinder chamber 2a, so that the former 2c is threadably moved in the latter 2a.

The pressurizing piston 2b, slidably fitted in the pressurizing cylinder chamber 2a, is pushed into the pressurizing cylinder chamber 2a by the pushing screw 2c. The inner end face of the pushing screw 2c is in abutment with the outer end face of the pressurizing piston 2b. The pushing screw 2c has a locking hole 2e in the outer end face into which the end portion of a hexagon wrench or the like is inserted to screw in and out the pushing screw 2c.

A cylinder chamber 3 is formed in the outer cylindrical surface of the pusher body at the position which is diametrically opposite to the fluid pressure adjusting section 2, being open in the outer cylindrical surface 1e of the pusher body.

More specifically, the cylinder chamber 3 is extended from the outer cylindrical surface 1e towards the central axis of the pusher body. A piston 3a is slidably fitted in the cylinder chamber 3.

In the cylinder chamber 3, one end portion of a thrust measuring bar 4 is connected to the outer end face of the piston 3a in such a manner that the other end portion of the thrust measuring bar 4 is exposed outside the cylinder chamber 3 and accordingly outside the outer cylindrical surface 1e of the pusher body.

A locking screw 3b is threadably engaged with the opening of the cylinder chamber 3. The locking screw 3b has a through-hole 3c at the center through which the other end portion of the above-described thrust measuring bar 4 is extended to be exposed outside the outer cylindrical surface 1e of the pusher body. A communicating path 3d is provided between the cylinder chamber 3 and the above-described sealed fluid path 1d; that is, the cylinder chamber 3 is in communication with the sealed fluid path 1d through the communicating path 3d.

In the cylinder chamber 3, a spring 5 is set in the space defined by the locking screw 3b and the piston 3a, to urge the piston 3a inwardly. The spring 5 has a predetermined spring constant, and it is for instance a coil spring.

Thrust graduation lines are marked on the thrust measuring bar 4. When the thrust measuring bar 4 is protruded outside through the hole 3c of the locking screw 3b, the graduation line level with the opening of the hole 3c is read to measure the pressure of fluid in the sealed fluid path 1d.

As the pressure of fluid in the sealed fluid path 1d increases, the pressure of fluid in the cylinder chamber 3 communicated through the communicating path 3d with the sealed fluid path 1d is increased, as a result of which the piston 3a is pushed outwardly by the pressure.

The piston 3a is kept urged inwardly by the spring 5. However, in this case, the piston 3a is slid outwardly against the elastic force of the spring 5. As a result, the amount of protusion through the hole 3 c of the locking screw 3 b of the thrust measuring bar 4 connected to the piston 3a is increased in the amount of protrusion from the hole 3c of the locking screw 3b. Hence, by reading the thrust graduation line on the thrust measuring bar 4 which is level with the opening of the hole 3c, the pressure of fluid in the sealed fluid path 1d can be measured.

Now, the operation of the above-described embodiment will be described.

The fluid type pusher 1 is mounted on the shaft a on which a part b is set, and then fixed to the shaft a with a nut c.

Under this condition, for instance the end portion of a hexagon wrench d is inserted into the locking hole 2e of the pushing screw 2c in the fluid pressure adjusting section 2. The hexagon wrench d is turned to threadably move the pushing screw 2c towards the back of the pressurizing cylinder chamber 2a.

In other words, by turning the hexagon wrench d, the pushing screw 2c is moved towards the back of the pressurizing cylinder chamber while being turned. The pressurizing piston 2b is in abutment with the end of the pushing screw 2c which is being moved towards the back of the pressurizing cylinder chamber 2a. Hence, the pressurizing piston 2b is also pushed towards the back of the pressurizing cylinder chamber 2a.

As the pressurizing piston 2b is pushed in the above-described manner, the pressure of fluid in the pressurizing cylinder chamber 2a is increased. As the pressure of fluid in the pressurizing cylinder chamber 2a is increased, the pressure of fluid in the sealed fluid path 1d communicating with the pressurizing cylinder chamber 2a is increased equal to the pressure of fluid in the latter 2a. As a result, the pushing piece 1c is pushed against the part b by the fluid in the sealed fluid path 1d.

On the other hand, as the pressure of fluid in the sealed fluid path 1d is increased, the pressure of fluid in the cylinder chamber 3 is also increased which is communicated through the communicating path 3d with the sealed fluid path 1d, so that the pressure of fluid in the cylinder chamber 3 becomes equal to the pressure of fluid in the sealed fluid path 1d. As the pressure of fluid in the cylinder chamber 3 is increased, the piston 3a tends to slide outwardly as it is pushed by the pressure.

In this operation, the piston 3a is kept urged in the opposite direction (inwardly) by the spring 5. However, when the pressure of fluid in the cylinder 3 reaches a predetermined value, the piston 3a is moved outwardly against the elastic force of the spring 5. In this case, the amount of movement of the piston 3a is proportional to the pressure of fluid.

As the piston 3a is moved outwardly, the one end portion of the thrust measuring bar 4 which is not connected to the piston 3a, is protruded outside through the hole 3c of the locking screw 3b in proportion to the pressure of fluid.

The thrust graduation lines have been marked on the thrust measuring bar 4. By referring to the thrust measuring bar thus protruded, the pressure of fluid in the sealed fluid path 1d can be measured. More specifically, by reading the graduation line level with the opening of the hole 3c of the locking screw 3b, the pressure of fluid in the sealed fluid path 1d can be detected.

As is apparent from the above description, the thrust of the pushing piece 1c pushing the part can be readily measured with the aid of the thrust measuring bar 4, which dispenses with the use of an expensive gauge-withfitted torque wrench.

While there has been described in connection with the preferred embodiment, the invention is not limited thereto or thereby. That is, it goes without saying that it will be obvious that various changes and modifications may be made therein without departing from the invention. In the above-described embodiment, the one end portion of the thrust measuring bar 4 is protruded from the outer cylindrical surface 1e of the fluid type pusher 1. However, for safety, the fluid type pusher may be modified as shown in FIG. 3. That is, a recess if is formed in the outer cylindrical surface 1e, and the cylinder chamber 3 including the piston 3a with the thrust measuring bar 4 is arranged substantially in parallel with the outer cylindrical surface 1e, so that the thrust measuring bar 4 is protruded in the recess if thus formed. That is, in the fluid type pusher thus modified, the thrust measuring bar 4 is prevented from protruding beyond the outer cylindrical surface 1e.

Furthermore, in the above-described embodiment, the pushing piece 1c is annular; however, the invention is not limited thereto or thereby. That is, as shown in FIG. 4, piston-like pushing pieces 1c may be employed. The inner surface of the through-hole 1a of the pusher body may be threaded so that the pusher body is used as a nut.

As is apparent from the above description, in the fluid type pusher according to the invention, the thrust of the pushing piece for pushing a part with fluid pressure can be readily read from the thrust measuring bar which is protruded in proportion to the fluid pressure, which dispenses with the use of an expensive gauge-withfitted torque wrench, thus resulting in a large cost reduction. Since the hexagon wrench is inexpensive and scarcely broken, it can be handled readily, and can be used at the working side with ease.

In the conventional gauge-withfitted torque wrench, the torque gauge is limited in the range of graduations. Hence, in the case where it is required to adjust the thrust of the pushing piece in a wide range which is adapted to push a part with fluid pressure, it is necessary to use a plurality of gauge-fitted torque wrenches. On the other hand, with the fluid type pusher of the invention, the thrust is detected by reading the thrust graduation lines of the thrust measuring bar. Hence, one inexpensive torque wrench is good enough for the adjustment.

Furthermore, in the fluid type pusher of the invention, the spring constant is suitably selected so that, the thrust graduation lines of the thrust measuring bar, which are read at the level of the outer cylindrical surface of the body of the fluid type pusher or of the bottom of the recess formed in the body, coincide with the thrusts which the pushing piece applies to push the part with fluid pressure. Hence, in the case of the fluid type pusher of the invention, unlike the conventional gauge-withfitted torque wrench, it is unnecessary to convert torque values into thrust values; that is, the thrust values can be readily detected by reading the thrust graduation lines of the thrust measuring bar which is protruded from the outer cylindrical surface of the body of the fluid type pusher or the bottom of the recess formed therein. Hence, the operator can increase or decrease the fluid pressure applied to the pushing piece which is adapted to push the part with fluid pressure, while concurrently monitoring the produced thrust directly with the thrust graduation lines of the thrust measuring bar.

What is claimed is:

1. An annular fluid type pusher for tightening a part on a shaft, said annular fluid type usher comprising:

a body mounted on the shaft on which the part to be tightened is set;

a pushing piece for pushing the part set on the shaft with a fluid pressure;

a sealed fluid path formed annularly in said body for containing a fluid, said pushing piece being slidably disposed in said fluid path;

a fluid pressure adjusting means for adjusting said fluid pressure of said fluid in said sealed fluid path;

an indicator cylinder chamber within said body in communication with said sealed fluid path;

a indicator piston slidably provided in said cylinder chamber;

a spring having a predetermined spring constant to urge said piston against the fluid pressure; and a thrust indicator for constantly measuring a current value of said pressure, said thrust indicator being in the form of bar on which thrust graduation lines have been marked with one end portion of said thrust indicator being connected to said piston, the other end portion being provided in such a manner as to be protruded in association with the movement of said piston which is slidably moved in proportion to the fluid pressure.

2. An annular fluid type pusher according to claim 1, wherein said fluid pressure adjusting means comprising:

a pressure cylinder chamber communicated with said sealed fluid path, said pressure cylinder chamber being open to an outer cylindrical surface of said body;

a pressure piston slidably provided in said pressure cylinder chamber;

a pushing screw abutted against the outer surface of said pressure piston, said pushing screw being threadably engaged with the cylindrical inner surface of said pressure cylinder chamber; and a hexagon wrench for turning said pushing screw.

3. An annular fluid type pusher according to claim 1, wherein said body has a recess in an outer cylindrical surface for accommodating a protruded portion of said thrust indicator, wherein said indicator cylinder chamber extends from said recess, and wherein said indicator cylinder chamber, said indicator piston, said thrust indicator are arranged substantially in parallel with the outer cylindrical surface of said body.

4. An annular fluid type pusher according to claim 1, wherein said pushing piece is in the form of annulus.

5. An annular fluid type pusher according to claim 1, wherein said pushing piece comprises a plurality of pushing pistons, said pushing pistons being arranged circularly.

6. An annular fluid type pusher according to claim 1, wherein said pushing piece comprises a plurality of piston-like pushing pieces.

7. An annular fluid type pusher according to claim 1, wherein said indicator cylinder chamber is formed in an outer cylindrical surface of said body opposite to said fluid pressure adjusting means.

* * * * *